United States Patent
Fuller et al.

(10) Patent No.: US 9,886,310 B2
(45) Date of Patent: Feb. 6, 2018

(54) DYNAMIC RESOURCE ALLOCATION IN MAPREDUCE

(71) Applicant: International Business Machines Corporation, Armonk, NY (US)

(72) Inventors: Nicholas C. Fuller, North Hills, NY (US); Min Li, San Jose, CA (US); Shicong Meng, Elmsford, NY (US); Jian Tan, Wappingers Falls, NY (US); Liangzhao Zeng, Yorktown Heights, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 14/176,635

(22) Filed: Feb. 10, 2014

(65) Prior Publication Data

US 2015/0227393 A1 Aug. 13, 2015

(51) Int. Cl.
*G06F 9/50* (2006.01)
*G06F 9/48* (2006.01)

(52) U.S. Cl.
CPC .......... *G06F 9/5011* (2013.01); *G06F 9/4881* (2013.01); *G06F 9/5061* (2013.01); *G06F 9/5094* (2013.01)

(58) Field of Classification Search
CPC .................................................. G06F 9/5094

(Continued)

(56) References Cited

U.S. PATENT DOCUMENTS

| | | | |
|---|---|---|---|
| 6,292,822 B1 * | 9/2001 | Hardwick | G06F 8/451 718/102 |
| 2011/0173410 A1 * | 7/2011 | Castillo et al. | 711/170 |

(Continued)

FOREIGN PATENT DOCUMENTS

CN 102763086 A 10/2012

OTHER PUBLICATIONS

Herodotou et al. Starfish: A Selftuning System for Big Data Analytics, 5th Biennial Conference on Innovative Data Systems Research (CIDR'11) Jan. 9-12, 2011, Asilomar, California, USA.

(Continued)

*Primary Examiner* — Li B Zhen
*Assistant Examiner* — Bradford Wheaton
(74) *Attorney, Agent, or Firm* — Ryan, Mason & Lewis, LLP

(57) ABSTRACT

Methods, systems, and articles of manufacture for dynamic resource allocation in MapReduce are provided herein. A method includes partitioning input data into one or more sized items of input data associated with a MapReduce job; determining a total number of mapper components, and a total number of reducer components for the MapReduce job based on said partitioning; dynamically determining an allocation of resources to each of the total number of mapper components and reducer components during run-time of the MapReduce job, wherein said dynamically determining the allocation of resources comprises monitoring one or more utilization parameters for each of the total number of mapper components and total number of reducer components during run-time of the MapReduce job; and dynamically determining a number of concurrently executing mapper components and reducer components from the total number of mapper components and the total number of reducer components for the MapReduce job.

11 Claims, 3 Drawing Sheets

(58) Field of Classification Search
USPC .......................................................... 718/104
See application file for complete search history.

(56) References Cited

U.S. PATENT DOCUMENTS

| | | | |
|---|---|---|---|
| 2011/0225584 A1* | 9/2011 | Andrade et al. .............. | 718/100 |
| 2011/0283277 A1 | 11/2011 | Castillo et al. | |
| 2012/0131180 A1* | 5/2012 | Nomura ................ | G06F 9/5077 709/224 |
| 2012/0166447 A1* | 6/2012 | Nice ................. | G06F 17/30979 707/746 |
| 2012/0173709 A1* | 7/2012 | Li ......................... | G06F 9/5061 709/224 |
| 2013/0061248 A1 | 3/2013 | Weiler | |
| 2013/0085993 A1 | 4/2013 | Li et al. | |
| 2013/0204991 A1 | 8/2013 | Skjolsvold et al. | |
| 2013/0219068 A1 | 8/2013 | Ballani et al. | |
| 2013/0290976 A1* | 10/2013 | Cherkasova et al. ......... | 718/104 |
| 2013/0339966 A1* | 12/2013 | Meng et al. .................. | 718/102 |
| 2015/0081912 A1* | 3/2015 | Tan et al. ...................... | 709/226 |
| 2015/0169457 A1* | 6/2015 | Jackson ........................ | 711/135 |

OTHER PUBLICATIONS

Kwon et al. SkewTune: Mitigating Skew in MapReduce Applications, SIGMOD'12, May 20-24, 2012, Scottsdale, Arizona, USA.

Palanisamy et al. Purlieus: Locality-aware Resource Allocation for MapReduce in a Cloud, SC'11, Nov. 12-18, 2011, Seattle, Washington, USA.

Lee, Resource Allocation and Scheduling in Heterogeneous Cloud Environments, Diss. University of California, Berkeley, 2012.

Heintz et al. Cross-Phase Optimization in MapReduce, Proceedings of the IEEE International Conference on Cloud Engineering, IC2E, vol. 12, 2013.

Zaharia et al. Improving MapReduce Performance in Heterogeneous Environments, 8th USENIX Symposium on Operating Systems Design and Implementation, 2008.

Ananthanarayanan et al. Reining in the Outliers in Map-Reduce Clusters using Mantri, 9th USENIX Symposium on Operating Systems Design and Implementation, 2010.

Ananthanarayanan et al. Effective Straggler Mitigation: Attack of the Clones, 10th USENIX Symposium on Networked Systems Design and Implementation, Apr. 2013.

* cited by examiner

DYNAMIC RESOURCE ALLOCATION IN MAPREDUCE

FIELD OF THE INVENTION

Embodiments of the invention generally relate to information technology, and, more particularly, to MapReduce technologies.

BACKGROUND

MapReduce is a prominent paradigm for big data analytics, and many systems support MapReduce jobs or tasks. MapReduce jobs have different phases that include, for example, map, copy and/or shuffle, merge and/or sort, and reduce. Resource consumption at different phases for different jobs has different characteristics. For example, certain phases can be characterized as central processing unit (CPU) heavy while other phases can be characterized as memory heavy or input/output (I/O) heavy.

However, existing MapReduce systems only allow static allocation of resources at initialization. Further, such approaches cannot adapt to changing resource demand, which can lead to inefficiency and sub-optimal job performance. Accordingly, a need exists for techniques for dynamic resource allocation in MapReduce.

SUMMARY

In one aspect of the present invention, techniques for dynamic resource allocation in MapReduce are provided. An exemplary computer-implemented method can include steps of partitioning input data into one or more sized items of input data associated with a MapReduce job; determining a total number of mapper components, and a total number of reducer components for the MapReduce job based on said partitioning; dynamically determining an allocation of resources to each of the total number of mapper components and total number of reducer components during run-time of the MapReduce job, wherein said dynamically determining the allocation of resources comprises monitoring one or more utilization parameters for each of the total number of mapper components and total number of reducer components during run-time of the MapReduce job; and dynamically determining a number of concurrently executing mapper components and reducer components from the total number of mapper components and the total number of reducer components for the MapReduce job.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for dynamic resource allocation in MapReduce. At least one embodiment of the invention includes monitoring data on resource utilization and job execution progress collected while a MapReduce job is running to dynamically reconfigure the job to optimize performance. Accordingly, an example embodiment of the invention includes partitioning input data into appropriate sizes and providing dynamic resource allocation in MapReduce. Partitioning input data facilitates increasing parallelization while avoiding a superfluous number of small tasks, and also facilitates minimizing overhead on Java virtual machine (JVM) construction and/or destruction and communication between tasks.

Resource allocation as detailed herein enables the management of resources (such as CPU and/or memory) for mappers and reducers, as well as management of the number of concurrent mappers and reducers to facilitate full utilization of available resources to increase throughput. Additionally, at least one embodiment of the invention includes managing resources such as CPU, memory, and I/O resource for MapReduce containers during run-time to adapt to changing task characteristics. For example, if the task characteristics change from CPU-intensive to memory-intensive, the CPU resource allocation can be decreased while the memory allocation can be increased.

Tasks can run in containers, and such containers can be launched, for example, in a JVM. At least one embodiment of the invention can include managing virtual CPU (vCPU) count, buffer allocation, heap size, virtual I/O of container and threads, etc. As described herein, such management can include fully utilizing available resources to increase throughput and reduce job execution time.

An example embodiment of the invention includes determining the concurrent number of mapper and reducer components. Such a determination facilitates overlapping the map computation with the shuffling phase and improves the overall resource utilization.

Figure 1:
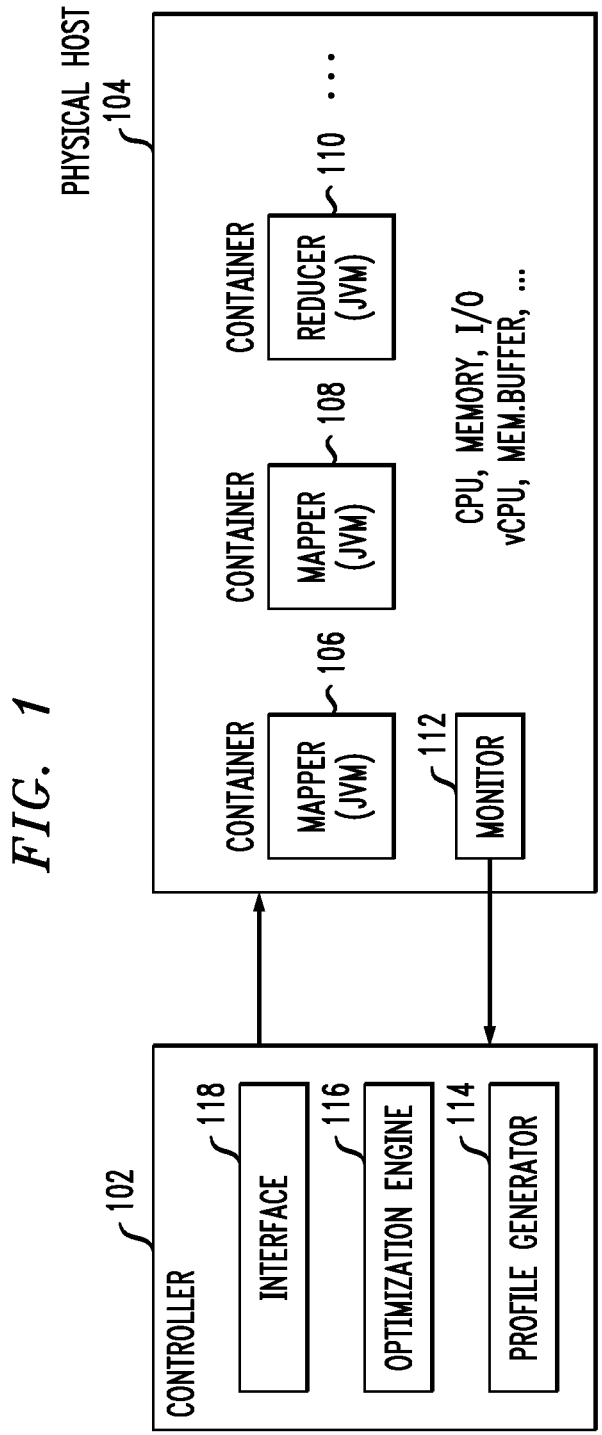
FIG. 1 is a block diagram illustrating an example embodiment, according to an aspect of the invention.

FIG. 1 is a block diagram illustrating an example embodiment, according to an aspect of the invention. By way of illustration, FIG. 1 depicts a controller component 102 and a physical host 104. The physical host 104 can include a first mapper component 106, a second mapper component 108, and a reducer component 110, each running in a JVM inside a container. A container specifies the resources that can be used by the corresponding mapper component or reduce component. The resource allocation of each container is independent from other containers and is determined by task characteristics.

Additionally, the physical host 104 includes a monitoring component 112. The monitoring component 112 collects monitored data associated with the physical host 104, wherein such data can include, for example, CPU, memory utilization, disk and network I/O traffic, currently running map and/or reduce tasks, progress, throughput, etc. The collected statistics are sent to the controller component 102 (periodically, for example), which dynamically generates a profile for the relevant tasks via a profile generator component 114. The tasks can be characterized, via a generated profile, as CPU-heavy, memory-heavy, and/or I/O-heavy. Additionally, the tasks can be characterized by associated buffer usage.

Based on the generated profiles, the optimization engine component 116 within the controller 102 identifies parameter effectiveness after a change in one or more task characteristics and identifies any parameter to be adjusted. Parameter effectiveness refers to the specified parameters that satisfy the task characteristics of mapper and reducer components and yield desirable performance. An example can include allocating more CPU resource to a CPU-intensive task and allocating more memory resources to a memory-intensive task. To validate the parameter effectiveness, at least one embodiment of the invention includes inspecting the CPU, memory and I/O utilization. If CPU or memory utilization of a container is exceeding a predefined threshold (for example, 95%), the CPU or memory resource of the task should be increased (as needed). Parameter adjustments can include, for example, an adjustment to the input size of a mapper and/or reducer component, an adjustment to the resource allocation associated with a mapper and/or reducer component, as well as an adjustment to the number of concurrent mapper and/or reducer components. As such, at least one embodiment of the invention includes adjusting one or more parameters to (corresponding) new values through a programmable interface such as interface 118 depicted in FIG. 1.

One or more embodiments of the invention can additionally include validating the effectiveness of any adjustment made, and iterating the sequence of steps illustrated via FIG. 1 to complete one or more control loops.

Figure 2:
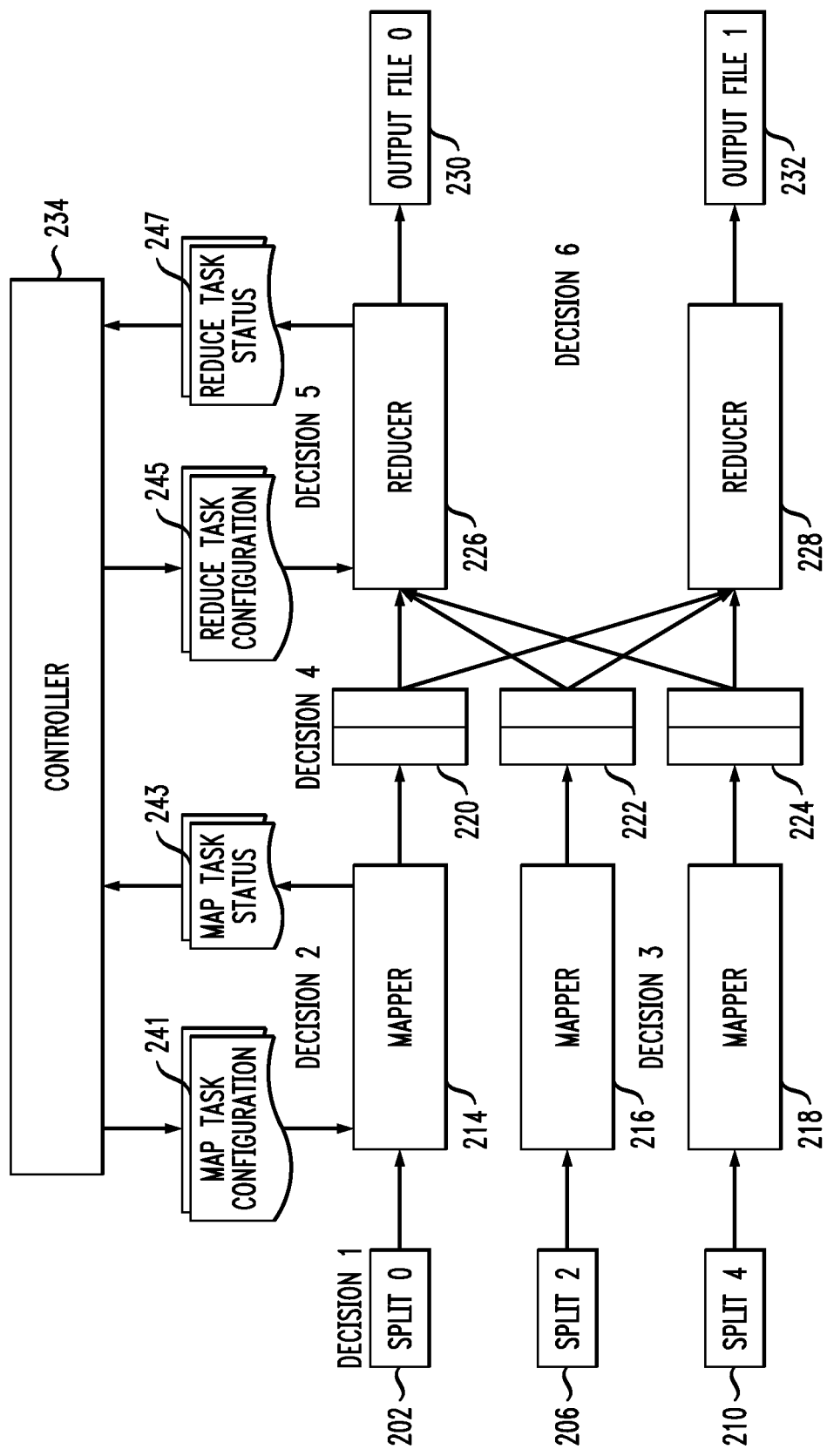
FIG. 2 is a diagram illustrating an exemplary flow diagram of decisions, according to an embodiment of the present invention.

FIG. 2 is a diagram illustrating an exemplary flow diagram of decisions, according to an embodiment of the present invention. By way of illustration, FIG. 2 depicts a controller 234, which, as detailed further below, obtains task statistics from each of multiple mapper and reducer components. Also, each mapper component takes a split as input, has one split deleted, and the relevant text is updated correspondingly.

Additionally, FIG. 2 depicts a first decision that includes determining the size of various splits (that is, the sizes of various inputs). As illustrated in the example shown in FIG. 2, those splits can include split (0) 202, split (2) 206, and split (4) 210. Input size determines the total number of mappers and execution duration of a map task. A smaller input size results in a larger number of mappers, while a larger input size results in a smaller number of mappers. In making such a determination, at least one embodiment of the invention includes monitoring a given mapper execution duration, and changing input size based on the execution duration. If the execution duration is less than a certain threshold, the map input size is increased. If execution duration is greater than a certain threshold, the map input size is decreased. At least one embodiment of the invention includes increasing or decreasing the map input size proportional to the original input size based on the deviation from the predefined threshold in terms of execution duration Also, throughput of the given mapper can be monitored to validate the effectiveness of this size tuning. Further, a similar approach can be used for tuning the number of reducers, which is illustrated in FIG. 2 as Decision 4. The total number of reducers determines how many partitions map output 220, map output 222, map output 224 generate, wherein such partitions which are then sent to the corresponding reducers. The changed input size can be deployed, for example, via the interface component illustrated in FIG. 1.

Additionally, Decision 2, as depicted by FIG. 2, can include determining resource allocation to one or more mapper components according to the splits determined in the Decision 1. In the example illustrated in FIG. 2, split (0) 202 is allocated to mapper 214, split (2) 206 is allocated to mapper 216, and split (4) 210 is allocated to mapper 218. As also illustrated in FIG. 2, mappers 214, 216 and 218 receive new job and/or task configurations 241 from controller 234 and change the corresponding mapper's configuration or use the new configuration to initiate a future mapper. As such, the mappers 214, 216 and 218 can each provide a map task status 243 to the controller 234.

Also, as further depicted in the example embodiment illustrated in FIG. 2, reducers 226 and 228 receive reduce input data via mapper outputs 220, 222 and 224. Such outputs (that is, outputs 220, 222 and 224) are results of a mapper task. Additionally, reducers 226 and 228 receive new job and/or task configurations 245 from the controller 234 and change the corresponding reducer's configuration or use the new configuration to initiate a future reducer. Further, the reducers 226 and 228 can each provide a reduce task status 247 to the controller 234.

Accordingly, tuning resource allocation for mappers includes monitoring system utilization for the given mappers, characterizing one or more types of bottleneck and adjusting the resource allocation for the given mappers accordingly. Also, throughput of the given mapper can be monitored to validate the effectiveness of the resource allocation tuning. In tuning the resource allocation for a given mapper, the following example circumstances can be used for guidance. If the given mapper includes low system utilization, both CPU and memory configuration can be scaled down. If the given mapper is CPU bound, the CPU configuration can be scaled up. Similarly, if the given mapper is memory bound, the memory configuration can be scaled up. More specially, one or more embodiments of the invention include determining the amount by which these new values should be changed, which includes setting the value based on the ratio of the current utilization to a predefined utilization threshold.

Further, a similar approach can be used for tuning the resource allocation of reducers, which is illustrated in FIG. 2 as Decision 5.

Decision 3, as depicted by FIG. 2, includes determining the number of concurrent mappers, while Decision 6 includes determining the number of concurrent reducers. In tuning the number of concurrent mappers, the concurrency of mappers determines the number of waves for map tasks. The number of waves is primarily determined by the total number of mappers divided by the number of concurrent mappers. Accordingly, a tuning goal can include maximizing the concurrency to reduce overall execution duration of a map phase and overlapping the map phase with shuffle phase intelligently.

In at least one embodiment of the invention, tuning the number of concurrent mappers includes monitoring system resource utilization, and increasing the number of concurrent mappers if there are sufficient idle system resources for initiating additional mappers. Also, throughput of a given mapper can be monitored to validate the effectiveness of a concurrency tuning. Further, a similar approach can be used for tuning the number of concurrent reducers. Ultimately, as also depicted by FIG. 2, output file (0) 230 and output file (1) 232 are generated, wherein such files store the computation results from reducers.

As detailed herein, any one (or more) of the six decisions illustrated in FIG. 2 can effectively improve job execution time by improving resource utilization, reducing disk I/O or reducing network traffic. Additionally, by way merely of example, related Hadoop parameters for key decisions can include the following:

Decision 1:
dfs.blocksize,
mapreduce.input.fileinputformat.split.minsize, and
mapreduce.job.maps;
Decision 2:
mapreduce.map.memory.mb, and
mapreduce.map.cpu.vcores;
Decision 3:
yarn.scheduler.capacity.<queue-path>.minimum-user-limit-percent, and
yarn.scheduler.capacity.<queue-path>.maximum-applications;
Decision 4:
mapreduce.job.reduce;
Decision 5:
mapreduce.reduce.memory.mb, and
mapreduce.reduce.cpu.vcores; and
Decision 6:
yarn.scheduler.capacity.<queue-path>.minimum-user-limit-percent,
yarn.scheduler.capacity.<queue-path>.maximum-applications, and
mapreduce.job.reduce.slowstart.completedmaps.

Figure 3:
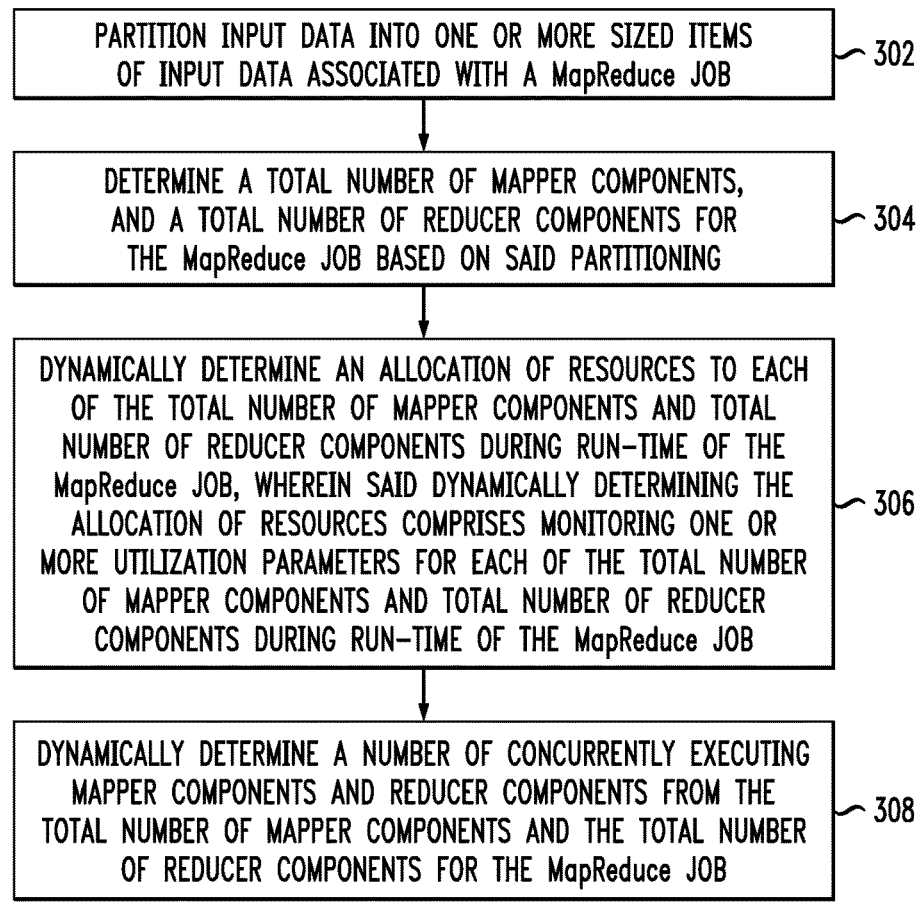
FIG. 3 is a flow diagram illustrating techniques according to an embodiment of the invention.

FIG. 3 is a flow diagram illustrating techniques according to an embodiment of the present invention. Step 302 includes partitioning input data into one or more sized items of input data associated with a MapReduce job. As detailed herein, partitioning can include monitoring execution duration associated with the MapReduce job. Also, at least one embodiment of the invention includes changing the size of the one or more items of input data based on said execution duration. In such an embodiment, the changing can include increasing the size of the items of input data if said execution duration is less than a given threshold. Similarly, the changing can include decreasing the size of the items of input data if said execution duration is greater than a given threshold.

Step 304 includes determining a total number of mapper components, and a total number of reducer components for the MapReduce job based on said partitioning. Step 306 includes dynamically determining an allocation of resources to each of the total number of mapper components and total number of reducer components during run-time of the MapReduce job, wherein said dynamically determining the allocation of resources comprises monitoring one or more utilization parameters for each of the total number of mapper components and total number of reducer components during run-time of the MapReduce job. Dynamically determining the allocation of resources can include characterizing a type of bottleneck identified based on said monitoring, and adjusting the allocation of resources based on the identified type of bottleneck.

Step 308 includes dynamically determining a number of concurrently executing mapper components and reducer components from the total number of mapper components and the total number of reducer components for the MapReduce job. Dynamically determining the number of concurrently executing mapper components and reducer components can include determining such numbers to reduce overall execution duration of the MapReduce job. Additionally, dynamically determining the number of concurrently executing mapper components and reducer components can include monitoring resource utilization during the MapReduce job, and increasing the number of concurrently executing mapper components and reducer components if sufficient idle resources are available based on said monitoring.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
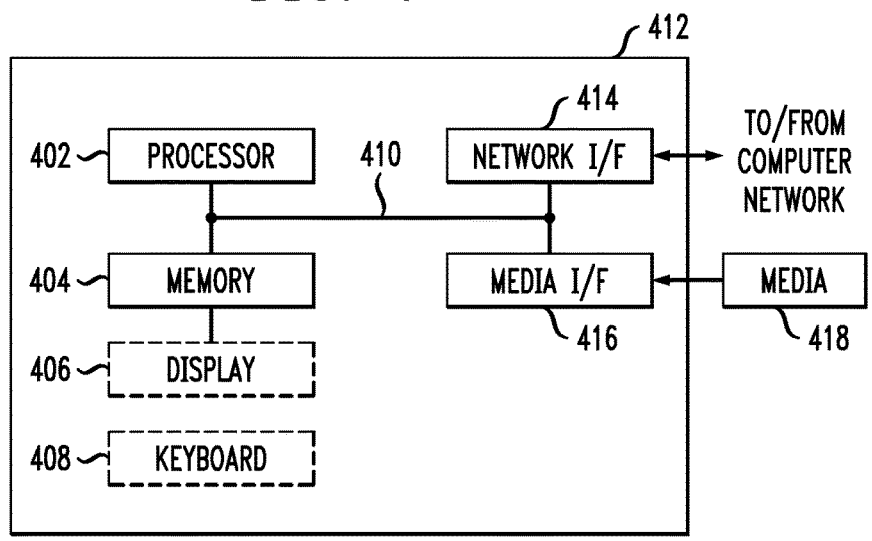
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, dynamically allocating resources for different MapReduce applications based on multiple configuration parameters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising steps of:
    partitioning input data into one or more sized items of input data associated with a MapReduce job, wherein said partitioning comprises changing the size of the input data based on an execution duration associated with the MapReduce job, wherein said changing comprises (i) increasing the size of the input data if said execution duration is less than a given threshold and (ii) decreasing the size of the input data if said execution duration is greater than the given threshold, and wherein said partitioning comprises ensuring that the number of input data items having a size below a given size is less than a predetermined threshold number;
    determining a total number of mapper components, and a total number of reducer components for the MapReduce job based on said partitioning;
    dynamically determining an allocation of resources to each of the total number of mapper components and total number of reducer components during run-time of the MapReduce job, wherein said dynamically determining the allocation of resources comprises (i) monitoring one or more utilization parameters for each of the total number of mapper components and total number of reducer components during run-time of the MapReduce job, (ii) characterizing a type of bottleneck from among multiple types of bottlenecks based on said monitoring, and (iii) dynamically determining the allocation of resources based at least on the type of bottleneck; and
    dynamically determining a number of concurrently executing mapper components and reducer components from the total number of mapper components and the total number of reducer components for the MapReduce job;
    wherein said steps are carried out by at least one computing device.

2. The method of claim 1, wherein said partitioning comprises monitoring the execution duration associated with the MapReduce job.

3. The method of claim 1, wherein said dynamically determining the number of concurrently executing mapper components and reducer components comprises determining the number of concurrently executing mapper components and reducer components to reduce overall execution duration of the MapReduce job.

4. The method of claim 1, wherein said dynamically determining the number of concurrently executing mapper components and reducer components comprises monitoring resource utilization during the MapReduce job.

5. The method of claim 4, wherein said dynamically determining the number of concurrently executing mapper components and reducer components comprises increasing the number of concurrently executing mapper components and reducer components if sufficient idle resources are available based on said monitoring.

6. An article of manufacture comprising a computer readable storage medium having computer readable instructions tangibly embodied thereon which, when implemented, cause a computer to carry out a plurality of method steps comprising:
   partitioning input data into one or more sized items of input data associated with a MapReduce job, wherein said partitioning comprises changing the size of the input data based on an execution duration associated with the MapReduce job, wherein said changing comprises (i) increasing the size of the input data if said execution duration is less than a given threshold and (ii) decreasing the size of the input data if said execution duration is greater than the given threshold, and wherein said partitioning comprises ensuring that the number of input data items having a size below a given size is less than a predetermined threshold number;
   determining a total number of mapper components, and a total number of reducer components for the MapReduce job based on said partitioning;
   dynamically determining an allocation of resources to each of the total number of mapper components and total number of reducer components during run-time of the MapReduce job, wherein said dynamically determining the allocation of resources comprises (i) monitoring one or more utilization parameters for each of the total number of mapper components and total number of reducer components during run-time of the MapReduce job, (ii) characterizing a type of bottleneck from among multiple types of bottlenecks based on said monitoring, and (iii) dynamically determining the allocation of resources based at least on the type of bottleneck; and
   dynamically determining a number of concurrently executing mapper components and reducer components from the total number of mapper components and the total number of reducer components for the MapReduce job.

7. The article of manufacture of claim 6, wherein said partitioning comprises monitoring the execution duration associated with the MapReduce job.

8. The article of manufacture of claim 6, wherein said dynamically determining the number of concurrently executing mapper components and reducer components comprises monitoring resource utilization during the MapReduce job.

9. A system comprising:
   at least one memory; and
   at least one processor coupled to the memory and configured for:
      partitioning input data into one or more sized items of input data associated with a MapReduce job, wherein said partitioning comprises changing the size of the input data based on an execution duration associated with the MapReduce job, wherein said changing comprises (i) increasing the size of the input data if said execution duration is less than a given threshold and (ii) decreasing the size of the input data if said execution duration is greater than the given threshold, and wherein said partitioning comprises ensuring that the number of input data items having a size below a given size is less than a predetermined threshold number;
      determining a total number of mapper components, and a total number of reducer components for the MapReduce job based on said partitioning;
      dynamically determining an allocation of resources to each of the total number of mapper components and total number of reducer components during run-time of the MapReduce job, wherein said dynamically determining the allocation of resources comprises (i) monitoring one or more utilization parameters for each of the total number of mapper components and total number of reducer components during run-time of the MapReduce job, (ii) characterizing a type of bottleneck from among multiple types of bottlenecks based on said monitoring, and (iii) dynamically determining the allocation of resources based at least on the type of bottleneck; and
      dynamically determining a number of concurrently executing mapper components and reducer components from the total number of mapper components and the total number of reducer components for the MapReduce job.

10. The system of claim 9, wherein said partitioning comprises monitoring the execution duration associated with the MapReduce job.

11. The system of claim 9, wherein said dynamically determining the number of concurrently executing mapper components and reducer components comprises monitoring resource utilization during the MapReduce job.

* * * * *